US007440422B1

(12) United States Patent
Holma et al.

(10) Patent No.: US 7,440,422 B1
(45) Date of Patent: Oct. 21, 2008

(54) METHOD FOR DATA TRANSMISSION IN A CELLULAR TELECOMMUNICATION SYSTEM

(75) Inventors: Harri Holma, Espoo (FI); Hannu Hakkinen, Espoo (FI); Antero Alvesalo, Espoo (FI)

(73) Assignee: Nokia Corporation, Espoo (FI)

( * ) Notice: Subject to any disclaimer, the term of this patent is extended or adjusted under 35 U.S.C. 154(b) by 697 days.

(21) Appl. No.: 09/717,535

(22) Filed: Nov. 21, 2000

Related U.S. Application Data

(63) Continuation of application No. PCT/EP98/03218, filed on May 29, 1998.

(51) Int. Cl.
*H04B 7/00* (2006.01)
(52) U.S. Cl. .................. 370/278; 370/280; 375/138
(58) Field of Classification Search ........... 370/280, 370/328, 329, 336, 342, 345, 347, 348, 277; 375/138
See application file for complete search history.

(56) References Cited

U.S. PATENT DOCUMENTS

| | | | | |
|---|---|---|---|---|
| 5,455,962 A | * | 10/1995 | Kotzin | 455/422.1 |
| 5,521,904 A | | 5/1996 | Eriksson et al. | |
| 5,533,013 A | | 7/1996 | Leppanen | |
| 5,581,547 A | | 12/1996 | Umeda et al. | |
| 5,581,548 A | * | 12/1996 | Ugland et al. | 370/330 |
| 5,594,738 A | | 1/1997 | Crisler et al. | |
| 6,041,046 A | * | 3/2000 | Scott et al. | 370/319 |
| 6,393,007 B1 | * | 5/2002 | Haartsen | 370/337 |

FOREIGN PATENT DOCUMENTS

| | | |
|---|---|---|
| EP | 0654916 A2 | 5/1995 |
| WO | WO 93/22850 | 11/1993 |
| WO | WO 97/45966 | 12/1997 |
| WO | WO 98/12678 | 3/1998 |

OTHER PUBLICATIONS

Katzela et al. "Channel Assignment Schemes for Cellular Mobile Telecommunication Systems: A Comprehensive Survey". IEEE. Jun. 1996. pp. 10-31.*

* cited by examiner

*Primary Examiner*—Firmin Backer
*Assistant Examiner*—Phuongchau B Nguyen
(74) *Attorney, Agent, or Firm*—Squire, Sanders & Dempsey

(57) ABSTRACT

The present invention proposes a method for data transmission in a cellular telecommunication system, in which system data are transmitted in units of bursts, each burst occupying a time slot (TS[j]) of one of consecutive frames (F[i]), each respective frame comprising a predetermined number (n) of time slots (TS[j]), j={(0, ..., n−1}), and, within a single time slot (TS[j]) of each frame (F[i]), data can be transmitted between a first transceiver device (BS) and a respective one of a plurality of second transceiver devices (MS) in a first transmission direction (DL) from said first transceiver device (BS) to said respective second transceiver device (MS) or in a second transmission direction (UL) from said respective second transceiver device (MS) to said first transceiver device (BS), wherein during a first frame (F[i]) of consecutive frames respective second transceiver devices (MS) perform transmission with said first transceiver device (BS) during a time slot (TS[k]) assigned thereto for transmission, and during a subsequent second frame (F[l=1]) of said consecutive frames, respective second transceiver devices (MS) perform transmission with said first transceiver device (BS) during a different time slot (TS[l]) assigned thereto for transmission, with 0≦k, 1≦n−1 and k#1.

12 Claims, 3 Drawing Sheets

8 Time Slots TS => 1 TDD/TDMA Frame F

METHOD FOR DATA TRANSMISSION IN A CELLULAR TELECOMMUNICATION SYSTEM

This application is a continuation of international application serial number PCT/EP98/03218, filed 29 May 1998.

FIELD OF THE INVENTION

The present invention relates to a method for data transmission in a cellular telecommunication system. In particular, the present invention relates to a method for data transmission with interference reduction in cellular telecommunication networks.

BACKGROUND OF THE INVENTION

Recently, cellular telecommunication networks operating, for example, according to the GSM standard have widely spread.

A) Cellular Network Structure

Generally, such networks consist of a plurality of cells. Within each cell, at least one locally fixed transceiver device is provided. Such a fixed and immobile transceiver device (a first type) named base station BS or base transceiver station BTS, respectively, establishes communication on a radio link (Um interface) to a plurality of mobile transceiver devices (a second type) named mobile station MS present within the cell. The cell architecture is hierarchically organized in that each respective base station BS is linked to a so-called base station controller device BSC, which controls the base station devices BS in the plurality of respective cells. Each such base station controller device BSC, in turn, communicates with a so called mobile switching center MSC, which controls a plurality of the BSC devices and provides for a possibility to access a public switched telephone network PSTN like for example an ISDN network.

The cellular architecture of such telecommunication networks is such that each cell is surrounded by, in general, six neighboring cells each of which is provided with a respective base station device BS. Each base station BS is designed and dimensioned such that its transmission power covers at least the area of the respective cell for establishing radio communication between the base station device BS and mobile stations MS present within the cell. Practically, however, the cell borders can not be assumed to be strict, but the cells have rather to be regarded as partially overlapping each other in terms of the transmission range of the base stations. Consequently, interference problems are likely to occur at cell borders, when a mobile station MS (second type transceiver device) receives signals from more than one base station BS (first type transceiver device) of adjacent cells, as will be detailed further below.

B) Transmission Principle

In such cellular telecommunication networks, there exists a first transmission direction from the first type of transceiver devices, namely the base stations BS, to the mobile stations MS as the second type of transceiver stations. This transmission called downlink DL means that the base station BS sends data and the mobile station MS receives data. A second transmission direction is the so called uplink transmission UL. Then, the mobile station MS sends data to the base station BS and the base station receives the data.

Cellular telecommunication systems operate according to the principle of TDMA, i.e. Time Divisional Multiple Access. This means, that the transmission of data is effected on a respective channel (associated to a predetermined frequency), and the transmission time available on each channel is shared by a number of mobile stations MS. The data as such are transmitted in downlink DL as well as in uplink UL transmission in units of bursts, each burst occurring during a predetermined period of time, a so-called time slot TS. A predetermined number n of time slots $TS[j]$, $0 \leq j \leq n-1$ is defined to form a frame F. According to GSM specification, n=8 time slots TS, namely $TS[0], \ldots, TS[7]$ form a frame. Thus, at a maximum, n mobile stations may communicate with a base station and vice versa every n-th time slot, assuming that a full rate speech traffic channel is used. However, it has to be noted that in case a half rate speech traffic channel is used, 2*n mobile stations MS may communicate per frame with a base station BS.

Hitherto, a transmission between a base station BS and respective mobile stations MS was arranged such that downlink transmission DL occurred during a first frame $F[i]$, while the reception of the "answers" of the respective mobile stations, i.e. uplink transmission UL, occurred in a subsequent frame $F[i+1]$. The succession of frames occurs in the so called multi-frame structure, adopting a 26-frame multi-frame for speech and data transmission and a 51-frame multi-frame for transmission of signaling information.

Most recent developments, however, have lead to a transmission principle of TDD/TDMA in cellular networks. That is, within a cellular network operating according to TDMA, time divisional duplex TDD is additionally introduced. In general, time divisional duplex means that sending and receiving of data is performed on a single frequency or channel and is shifted in time. Stated in other words, in connection with the transmission in frame units according to TDMA, within a frame F transmitted on a respective channel, there occurs sending of data in one time slot $TS[j]$ and reception of data in a subsequent time slot $TS[j']$ within the same frame. In particular, according to the principle of TDD, sending and reception is performed alternately within time slots of a frame. For example, considering a base station transceiver device BS, sending or downlink DL, respectively, is performed in time slots having an odd number, while reception or uplink UL, respectively, occurs in time slots having an even number. FIG. 1 illustrates an example for such an assignment of time slots $TS[j]$ within a frame F in conventional TDD/TDMA transmission. It should however be noted that it is also possible that uplink UL occurs in time slots having an odd number, while downlink DL occurs in time slots having an even number. Alternatively, in TDD operation it is also conceivable to adopt a different alternating time division between uplink and downlink such that, for example, uplink occurs for two immediately subsequent time slots TS ($TS[j]$ & $TS[j+1]$), and that downlink occurs for two further subsequent time slots TS ($TS[j+2]$ & $TS[j+3]$).

However, in TDD operation or TDD/TDMA operation of a cellular telecommunication network there exists a problem that depending on the specific case interference between uplink and downlink transmission may occur.

Now, some of these different problem cases are subsequently discussed.

Interference problems in asynchronous networks

As set our above, a cellular network is provided by a plurality of base station transceiver devices BS, one per each cell. Such a network is operating asynchronously, if the respective base stations are not synchronized with respect to each other. If, however, the respective base stations are not synchronized, uplink and downlink transmission in neighboring or adjacent cells will occur at different times. Consequently, if for example a mobile transceiver device MS is close to a cell border, i.e. in an area where the transmission ranges of at least two base transceiver devices BS of adjacent cells are overlapping, uplink transmission (sending) causes interference to downlink reception close to that mobile transceiver device MS.

Asymmetric division between uplink and downlink

In case the time division between uplink and downlink differs from cell to cell, i.e. between respective base stations BS1 and BS2 associated to a first and second cell, respectively, interference between uplink and downlink occurs at the cell borders of adjacent cells having asymmetry or different time division, respectively. FIG. 2 illustrates an example for such a situation of base stations BS1 and BS2. As shown, interference problems may occur in time slots TS[j], with j ∈ {1, 2, 5, 6}, since on one channel, uplink and downlink transmission is simultaneously present within the same time slot.

Several operators/several multiple access methods in the same band and in the same area The above description has heretofore been made for the case of a single cellular network only. That is, the cellular structure relates to the network operated by a single network operator only.

In practice, however, due to the increasing demand for mobile communication, it is rather the case that several network operators each run a cellular network in the same area. Moreover, these different networks may even use the same frequency band.

Therefore, even if the cells, i.e. the base stations in respective cells, within the cellular network of one operator are synchronized, there still remains the difficulty to synchronize the networks of several operators. Consequently, it is desirable that all networks within the same area and/or in the same frequency band should have the same asymmetry and adopt the same time division between uplink parts and downlink parts of a respective TDD/TDMA frame.

However, such a desired synchronization becomes even impossible, if the different operators are using different radio access techniques with different frame lengths. For example, in WB-TDMA (Wide Band Time Divisional Multiple Access) the frame length (of eight time slots) is 4.615 ms, while in WB-CBMA (Wide Band Code Divisional Multiple Access) the frame length is 10 ms. FIG. 3 illustrates such a situation for two base stations BS1, BS2 operating according to different radio access techniques. It has to be noted that the WB-CDMA frame is shown for time slots TS[0] to TS[5] only and is therefore illustrated incomplete. Nevertheless, it becomes clear that nearly two time slots of the WB-TDMA frame are transmitted during the period of a single time slot of the WB-CDMA frame. Hence, interference problems are very likely to occur in such a situation.

The above example has been described to illustrate the principle problems in such a case. However, it does not represent the current trend of actually implemented systems. According to the latest decision taken by ETSI (European Telecommunication Standards Institute), the principle of WB-TDMA is no longer considered for the transmission via the air interface (Um interface). Instead, for Europe it has been decided that frequency division duplex FDD is based on WB-CDMA and TDD is based on TD-CDMA (=time division CDMA=CDMA/TDMA). The frames length of both modes, FDD and TDD, is 10 ms. However, TDD mode is designed to form one frame of 16 time slots. Therefore, also in such a case of different numbers of time slots of respective different transmission modes during the same frame period, similar problems as those described herein above will apparently manifest.

Although networks operating according to DECT standard (Digital European Cordless Telephone) have recently been proposed, which are synchronized, the above mentioned second and third type of problems are still not solved in such networks.

Document WO 9322850 discloses a method for data transmission in a cellular telecommunication system as defined in the preambles of the independent claims 19 and 20. In detail, this document discloses a method of increasing interference diversity in an FDMA/TDMA-based cellular system, in which in sequential TDMA frames different time slots are used. A TDMA frame represents either a downlink frame or an uplink frame.

Furthermore, document WO 98 12678 A discloses a method of facilitating transmission level measurement. In this method, a base station moves the BCCH from one time slot to another so that the BCCH is sent in different time slots of successive frames.

SUMMARY OF THE INVENTION

It is therefore an object of the present invention to provide a method for data transmission in a cellular telecommunication system, by means of which interference problems can be reduced.

According to the present invention, this object is solved by a method for data transmission in a cellular telecommunication system, as defined in claim 19, and alternatively by a method for data transmission in a cellular telecommunication system as defined in claim 20.

Advantageous further developments of the present invention are as set out in the dependent claims.

In particular, the invention adopts a transmission principle such that transmission in a respective transmission direction UL, DL between a base station BS and a respective mobile station MS is no longer performed in fixed time slots within frames. That is, by changing a respective time slot TS for transmission between a base station BS and a respective mobile station MS from frame to frame, time hopping within a TDD frame is effected. Such time hopping may occur over all time slots of a respective frame either for uplink or downlink, or for both, uplink and downlink transmission within a TDD frame.

Due to the time hopping over all time slots of a frame, there is no longer an uplink part and/or downlink part present in the frame. Therefore, interference is averaged between transmission directions, operators and adjacent cells. Thus, due to interference averaging, the interference as such, originating from the same frequency band and from the same area, from adjacent cells or from cellular networks of other operators, operating according to a different radio access technique is reduced.

Moreover, due to the interference averaging between uplink an/or downlink, asymmetric resource allocation between transmission directions can advantageously be achieved. Thus, the present invention provides an advantageous alternative to the principle of dynamic channel allocation DCA. Nevertheless, the present invention can be applied in combination with the principle of DCA. Stated in other words, in this invention, DCA may additionally be applied to average other interference phenomena acting on the cell. Such interference averaging can, for example, be effected by using channel coding and an error control technique known as interleaving. Interleaving is a technique for changing burst errors into random error. If part of the contents of transmitted data is lost during transmission, errors can be corrected by a channel decoder at the reception side.

BRIEF DESCRIPTION OF THE DRAWINGS

In the following, the invention will be described in greater detail by way of example with reference to the accompanying drawings, in which.

DETAILED DESCRIPTION OF PREFERRED EMBODIMENTS

Preferred embodiments of the present invention are described herein below in detail with reference to the drawings.

Recently, in TDD frames, time slots were fixedly and time invariantly assigned for uplink/downlink transmission between a base station BS and respective mobile stations MS. Thus, in each TDD frame, there was an uplink part and a downlink part.

According to the present invention, however, within one cell or for each respective base station BS, time hopping is done over all time slots and there is no longer an uplink and/or downlink part in the frame.

That is, in case time hopping is performed for downlink transmission, only uplink transmission has fixedly allocated time slots. On the other hand, in case time hopping is performed for uplink transmission, only downlink transmission has fixedly allocated time slots. Moreover, if time hopping is performed for uplink and downlink transmission, none of the transmission directions has fixedly allocated time slots within a frame, and neither a downlink part nor an uplink part is present.

Figure 1:
FIG. 1 illustrates an example of the assignment of time slots TS[j] within a frame F for uplink and/or downlink transmission in conventional TDD/TDMA transmission.
Figure 2:
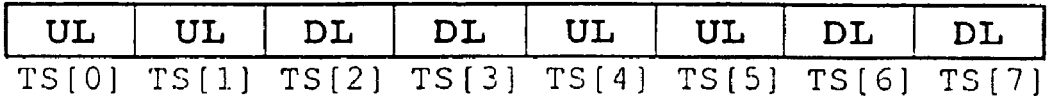
FIG. 2 illustrates an example for a situation of base stations BS1 and BS2 having a different time division for uplink and downlink, respectively, and which are therefore asymmetric.
Figure 2:
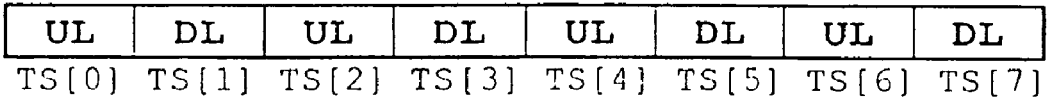
Figure 3:
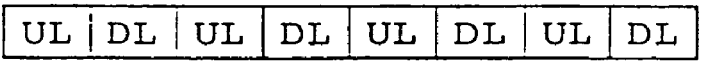
FIG. 3 illustrates an example of frames for two base stations BS1, BS2 operating according to different radio access techniques.
Figure 3:
Figure 4:
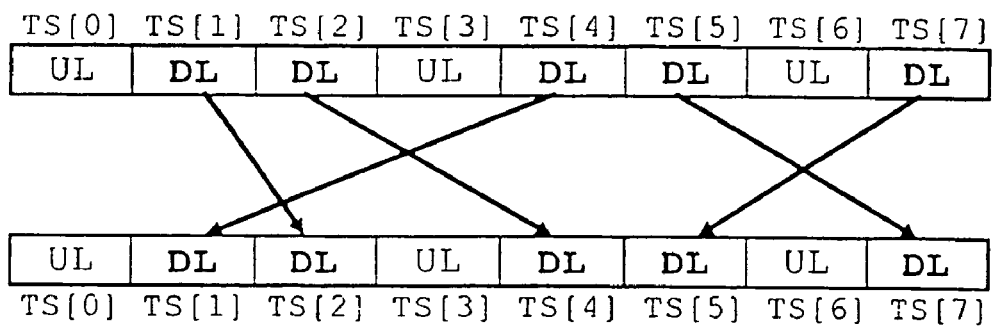
FIG. 4 shows an example for time hopping within consecutive TDD frames for downlink transmission according to the present invention.
Figure 5:
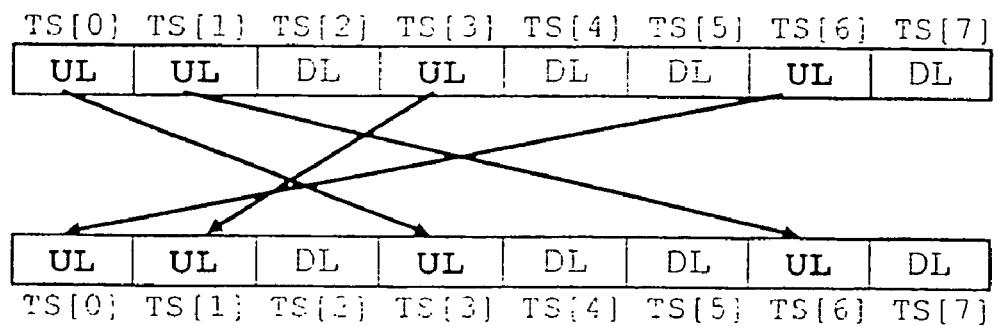
FIG. 5 shows an example for time hopping within consecutive TDD frames for uplink transmission according to the present invention.

The FIGS. 4 and 5 illustrate the present invention with reference to subsequent frames F[i] and F[i+1] occurring during respective consecutive time periods t1 and t2.

It is assumed for the following explanation that the frames/time slots refer to uplink and downlink transmission of an individual base station BS provided for one cell. The arrows depicted between respective consecutive frames and the respective time slots are intended for indicating the time hopping for a transmission direction (UL/DL) between the base station BS and a respective mobile station MS. It has to be noted that each time slot in which a transmission occurs designates a transmission between the base station BS and respective different mobile stations MS. In particular, due to time hopping being performed according to the present invention, the time slot during which a transmission between the base station BS and a respective mobile station MS is performed can change with each new frame.

FIG. 4 shows an embodiment of the present invention for the case in which transmission in uplink direction UL is performed in fixedly allocated time slots TS. However, with regard to downlink transmission DL, time hopping is performed. This means that the downlink transmission between the base station BS and respective mobile stations MS takes place in a different time slot in each frame. That is, time hoping for downlink transmission DL is performed among and limited to those time slots TS[j] which are not occupied by uplink transmission UL.

In general, time hopping for downlink transmission is performed such that the data transmission from the base station BS to a respective one of mobile stations MS during a time slot TS[1] in a first frame F[i] is shifted to a time slot TS[k], with $0 \leq k$, $1 \leq n-1$ and $k \neq 1$, in a subsequent frame F[i+1].

In the specifically depicted embodiment according to FIG. 4, uplink transmission UL occurs in each frame in time slots TS[j] with j=[0, 3, 6]. Furthermore, in the example as shown in FIG. 4, TS[1] is shifted to TS[2], TS[2] is shifted to TS[4], TS[4] is shifted to TS[1], TS[5] is shifted to TS[7], and TS[7] is shifted to TS[5].

Apparently, three time slots TS[j] are used for uplink transmission, while five time slots TS[j] are used for downlink transmission. Thus, an asymmetric resource allocation of available transmission capacity for the respective transmission directions is advantageously realized.

FIG. 5 shows a further embodiment in which transmission in downlink direction DL is performed in fixedly allocated time slots TS. However, with regard to uplink transmission UL, time hopping is performed. It has to be noted that the principles for time hopping as explained above with regard to FIG. 4 in connection with time hopping for downlink likewise apply to the case shown in FIG. 5, which depicts time hopping for uplink transmission.

In the specifically depicted example according to FIG. 5, downlink transmission DL occurs in each frame in time slots TS[j] with j=[2, 4, 5, 7]. Furthermore, in the example as shown in FIG. 5, TS[0] is shifted to TS[3], TS[1] is shifted to TS[6], TS[3] is shifted to TS[1], and TS[6] is shifted to TS[0].

In addition, in the example according to FIG. 5, four time slots are assigned for uplink and downlink transmission, respectively. Hence, in this example, the resource allocation is chosen to be symmetric.

Figure 6:
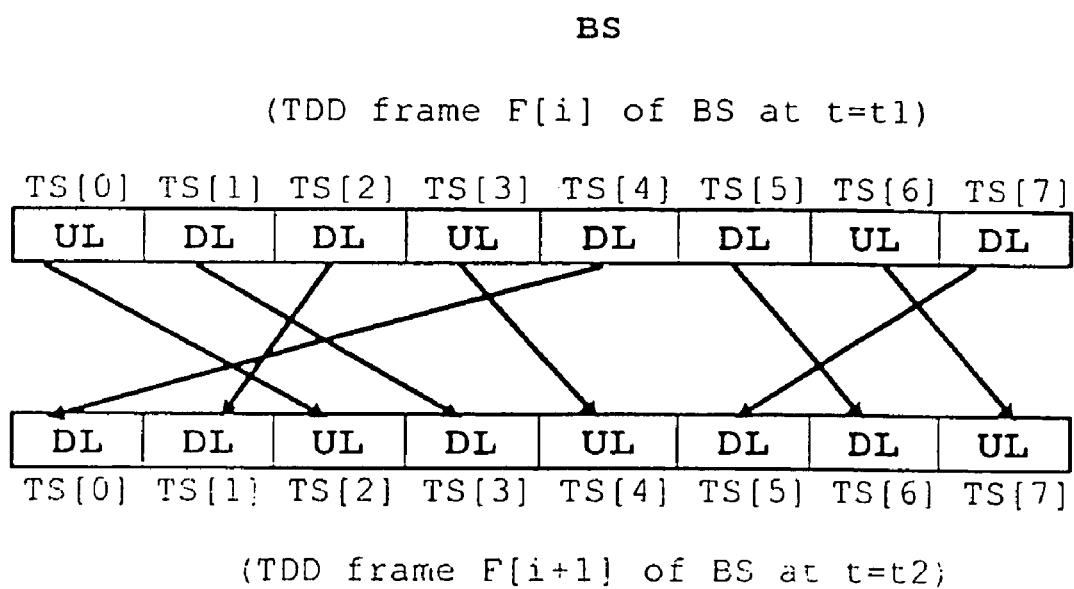
FIG. 6 shows an example for time hopping within consecutive TDD frames for downlink and uplink transmission according to the present invention.

FIG. 6 shows a further example, according to which time hopping is performed over all time slots TS[j] within subsequent frames F[i]. Thus, neither downlink nor uplink transmission is performed in fixedly allocated time slots in subsequent frames. Also in this example, three time lots TS are used for transmission in uplink direction, i.e. from a respective one of mobile stations MS to the base station BS of a cell, while five time slots TS are allocated for downlink transmission. Therefore, also according to the example depicted in FIG. 6, an asymmetric resource allocation is adopted.

In detail, time hopping for uplink transmission UL is performed such that TS[0] is shifted to TS[2], TS[3] is shifted to TS[4], and TS[6] is shifted to TS[7] in the frames F[i] and F[i+1] illustrated. Moreover, as regards downlink transmission DL, time hopping is performed such that TS[1] is shifted to TS[3], TS[2] is shifted to TS[1], TS[4] is shifted to TS[0], TS[5] is shifted to TS[6], and TS[7] is shifted to TS[5].

The time hopping (i.e. hopping between time slots in consecutive frames) can be performed according to a predefined pseudo-noise sequence. This sequence is known by the respective transmitter and the receiver (similar to the frequency sequence in connection with frequency hopping in GSM). Timing advance TA (due to the distance between the base station BS and a respective mobile station MS) is then controlled by the base station BS according to the base station measurements. Timing advance control is thus not much more difficult than in the case in which time hopping is not implemented. With respect to one base station BS, the time hopping sequences are orthogonal. This means that the sequences are such that there is no interference between connections (of plural mobile stations MS to the base station) or between uplink UL or downlink DL. In this regard as to orthogonality, time hopping is similar to dynamic channel allocation DCA with respect to one base station BS.

Generally, in a TDMA network the mobile stations MS must adjust their timing advance due to run time differences. These run time differences occur as a result of different transmission path lengths within the cell if the mobile station MS moves relative to the base station BS. Therefore, it is not possible for a mobile station to start uplink transmission immediately after the time slot for downlink reception.

Some TDMA terminals, however, may be able to support simultaneous reception and transmission. For example, this may be the case in a system operating according to GSM/HSCSD (HSCSD=High Speed Circuit Switched Data) with multislot transmission. If such terminals are implemented in the system, it depends on the capability of the mobile station MS, if the mobile station is able to simultaneously receive and send, whether uplink transmission may be started immediately after the time slot for downlink reception (or vice versa).

The above described examples of the present invention have been described with reference to consecutive frames transmitted at a specific frequency which the base station can use. It should however be noted that the present invention of time hopping within TDD frames can be combined with a case in which frequency hopping is performed. In such a case, the above examples will still remain valid, with the exception that a frame F[i] is physically transmitted at a different frequency than the subsequent frame F[i+1]. The different frequency can be selectively changed and can be chosen among the number of frequencies available for the respective base station BS.

As described above, adopting time hopping within TDD frames according to the invention reduces interference by averaging the occurring interference. The interference averaged may originate from the same band and from the same area, or the interference may come from adjacent cells or from networks operated by other operators. Due to averaging the interference between uplink and downlink, asymmetric resource allocation between transmission directions can be achieved.

The invention is applicable in case of TDMA and CDMA/TDMA networks. In systems operating according to the principle of CDMA/TDMA (TD-CDMA: time division CDMA), several users can share one time slot by using different spreading codes.

However, when such systems are operated in TDD mode, it has to be noted that it is possible to have only uplink or downlink transmission in one slot. This means, that it is not possible to allocate one code for downlink and one code for uplink within one time slot.

When implementing the invention, the used radio transceiver devices BS, MS are adapted to be controlled in the above described manner. In particular, base station transceiver devices BS will be controlled by means of a base station controller device BSC, the control function of which may be provided in a separate device or implemented as a part of the base transceiver station BS. Mobile radio transceiver devices MS will be controlled on the basis of the control signals transmitted, for example, via the FACCH, SDCCH or SACCH channels between the base station BS and the mobile station MS.

It should be understood that the above description and accompanying figures are only intended to illustrate the present invention by way of example only. The preferred embodiments of the method may thus vary within the scope of the attached claims.

The invention claimed is:

1. A method, comprising:

transmitting data in units of bursts, each burst occupying a time slot of one of consecutive frames, each respective frame comprising a predetermined number n of time slots, within each time slot of each frame, data can be transmitted between a first transceiver device and a respective one of a plurality of second transceiver devices either in a first transmission direction from said first transceiver device to said respective second transceiver device or in a second transmission direction from said respective second transceiver device to said first transceiver device, said second transmission direction is opposite to a transmission direction of another time slot of the same frame in which data is transmitted between said first transceiver device and another one of said second transceiver devices, wherein transmission in said first direction occurs in predetermined and fixed time slots in each of consecutive frames, and transmission in said second direction occurs in different time slots in each of consecutive frames, wherein in said second direction, during a first frame of consecutive frames respective second transceiver devices perform transmission to said first transceiver device during an assigned transmission $k^{th}$ time slot, and during a subsequent second frame of said consecutive frames, respective second transceiver devices perform transmission to said first transceiver device during a different assigned transmission $l^{th}$ time slot, with $0 \leq k$, $1 \leq n-1$ and $k \neq 1$.

2. The method according to claim 1, wherein transmission between said first transceiver device and respective second transceiver devices occurs in said first direction, in a first number of different time slots, and in said second direction, in a second number of different time slots, said first and said second number being selected such that the sum of said first and second number is less or equal to the number n of time slots within a frame.

3. The method according to claim 1, wherein frames are transmitted using a frequency of available frequencies, and the used frequency is selectively changed.

4. The method according to claim 1, wherein the frames are defined according to TDMA standard.

5. The method according to claim 1, wherein within each TDMA time slot code division can be applied between users.

6. The method according to claim 1, wherein said first transceiver device or one or more of said second transceiver devices are a radio transceiver device.

7. A method, comprising:

transmitting data in units of bursts, each burst occupying a time slot of one of consecutive frames, each respective frame comprising a predetermined number n of time slots, wherein within each time slot of each frame, data can be transmitted between a first transceiver device and a respective one of a plurality of second transceiver devices either in a first transmission direction from said first transceiver device to said respective second transceiver device or in a second transmission direction from said respective second transceiver device to said first transceiver device, said second transmission direction is opposite to a transmission direction of another time slot of the same frame in which data is transmitted between said first transceiver device and another one of said second transceiver devices, wherein transmission in said first direction occurs in different time slots in each of consecutive frames, and transmission in said second direction occurs in predetermined and fixed time slots in each of consecutive frames, wherein in said first direction during a first frame of consecutive frames respective first transceiver devices perform transmission to said second transceiver device during an assigned transmission $k^{th}$ time slot, and during a subsequent second frame of said consecutive frames, respective first transceiver devices perform transmission to said second transceiver device during a different assigned transmission $l^{th}$ time slot, with $0 \leq k$, $1 \leq n-1$ and $k \neq$.

8. A method according to claim 7, wherein transmission between said first transceiver device and respective second transceiver devices occurs in said first direction, in a first number of different time slots, and in said second direction, in a second number of different time slots, said first and said second number being selected such that the sum of said first and second number is less or equal to the number n of time slots with a frame.

9. A method according to claim 7, wherein frames are transmitted using a frequency of available frequencies, and the used frequency is selectively changed.

10. A method according to claim 7, wherein the frames are defined according to TDMA standard.

11. A method according to claim 7, wherein within each TDMA time slot code division can be applied between users.

12. The method according to claim 7, wherein said first transceiver or one or more of said second transceiver devices are a radio transceiver device.

* * * * *